J. KRAMER.
DEVICE FOR OPENING GATES.
APPLICATION FILED JAN. 20, 1911.
1,013,185.
Patented Jan. 2, 1912.
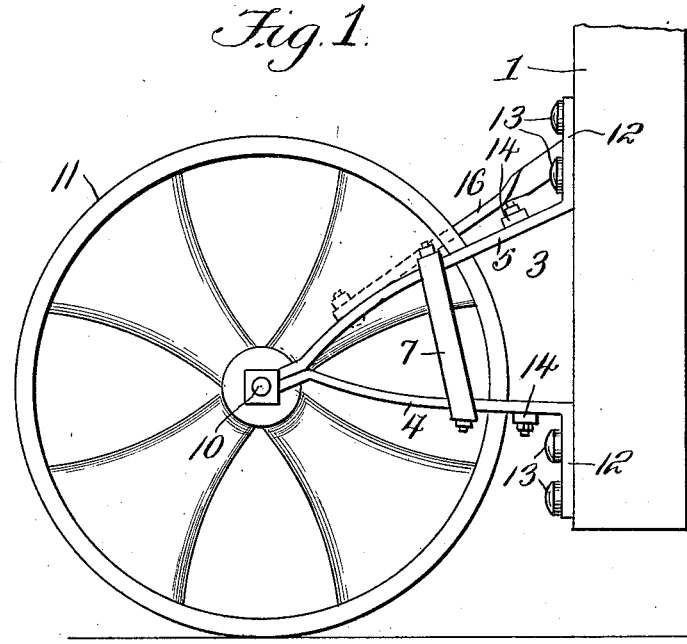
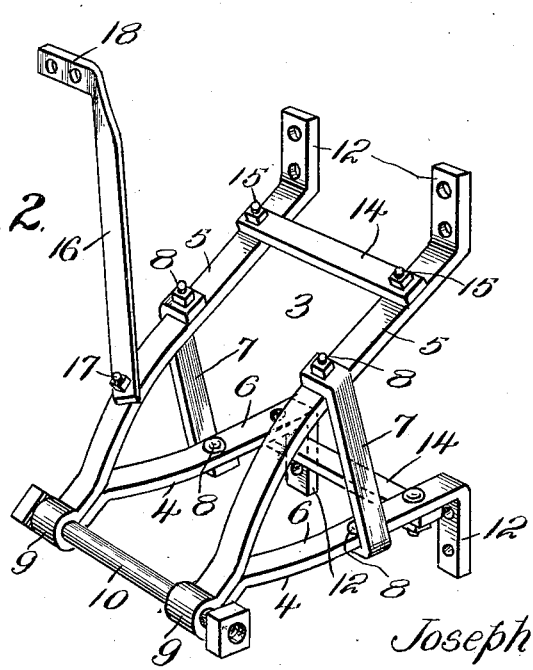
Witnesses
J. L. Wright
C. C. Hines
Inventor
Joseph Kramer,
By
Attorney.
COLUMBIA PLANOGRAPH CO., WASHINGTON, D. C.

UNITED STATES PATENT OFFICE.

JOSEPH KRAMER, OF ELDORA, IOWA.

DEVICE FOR OPENING GATES.

1,013,185.   Specification of Letters Patent.   Patented Jan. 2, 1912.

Application filed January 20, 1911. Serial No. 603,671.

*To all whom it may concern:*

Be it known that I, JOSEPH KRAMER, a citizen of the United States, residing at Eldora, in the county of Hardin and State of Iowa, have invented certain new and useful Improvements in Devices for Opening Gates, of which the following is a specification.

This invention relates to supports for farm and other heavy gates, the object of the invention being to provide a wheeled support which will prevent the gate from sagging on its hinges and dragging on the ground, and which is simple of construction, inexpensive of manufacture and adapted to support the gate in such manner as to permit it to be easily opened and closed.

The invention consists of the features of construction, combination and arrangement of parts hereinafter described and claimed, reference being had to the accompanying drawings, in which:

Figure 1 is an end view of a gate provided with my improved support. Fig. 2 is a perspective view of the frame of the support detached.

Referring to the drawings, 1 designates a swinging farm or other gate, provided at its free end with a wheeled support 3 constructed in accordance with my invention.

The support comprises a bracket or frame composed of two substantially V-shaped side pieces 4, each embodying an upper arm 5, and a lower arm 6 connected and reinforced about midway of their lengths by a vertical brace 7 having laterally bent ends bolted or riveted to the arms, as at 8. Each side piece is formed of a single length of strap metal bent into shape. The free ends of the arms 5 and 6 are formed at their points of juncture, i. e., at the vertex of the V-shaped bracket, with eyes 9, the eyes of the two side pieces being adapted for the reception of an axle pin or bolt 10 carrying a supporting wheel or roller 11. In rear of the eyes the arms are offset to provide lapping portions 9ª closing said eyes. The braces 7, by their described arrangement, hold the arms relatively rigid and prevent spreading of the lapping portions under strain.

The free ends of the arms 5 and 6 of the side pieces are bent at an angle upwardly and downwardly, respectively, to provide attaching portions or feet 12 perforated for the passage of bolts or other suitable fastenings 13 to secure the device to the frame of the gate 1. The respective upper and lower arms of the side pieces are connected by cross bars 14 bolted or riveted thereto, as at 15. These braces are arranged between the braces 7 and feet 12 and in conjunction with the braces 7, and axle pin or bolt, couple the side pieces in a rigid manner, providing a support of great strength and durability. To stay the device against lateral strain when applied, a brace arm 16 is provided and pivoted at one end, as at 17, the other or free end of said arm having an angularly bent attaching portion 18 apertured for the passage of bolts or the like 19 to fasten the same to the gate.

As shown, the device is fastened to the free end of the gate with the wheel or roller projecting below the gate and resting upon the surface of the ground, whereby such end of the gate is supported and the gate prevented from sagging on its hinges. When thus supported the free end of the gate is held at the proper level and, as the support has a rolling contact with the ground, the gate may be easily opened and closed.

It will be apparent that the structural strength of the device adapts it for supporting very heavy farm and other gates in an effective manner.

Having thus fully described my invention, I claim:

A support for swinging gates comprising a bracket composed of a pair of counterpart side members, each consisting of a single length of material bent into V-form and providing upper and lower arms, bent at their free ends to provide upwardly and downwardly extending attaching feet, said members being further bent at their vertices to form eyes integrally connecting said arms and offset to provide lapping portions closing said eyes, a vertical brace connecting the arms of each member at a point about midway of the length thereof to hold said arms relatively rigid and prevent separation of said lapped portions, transverse braces extending across the bracket and connecting the upper and lower arms of the respective side members at points between the attaching feet and vertical braces, a transverse axle pin fitted in said eyes, and a ground wheel carried by said axle pin.

In testimony whereof I affix my signature in presence of two witnesses.

JOSEPH KRAMER.

Witnesses:
J. B. MATHER,
M. D. KENNEDY.

Copies of this patent may be obtained for five cents each, by addressing the "Commissioner of Patents, Washington, D. C."